Figure 1:
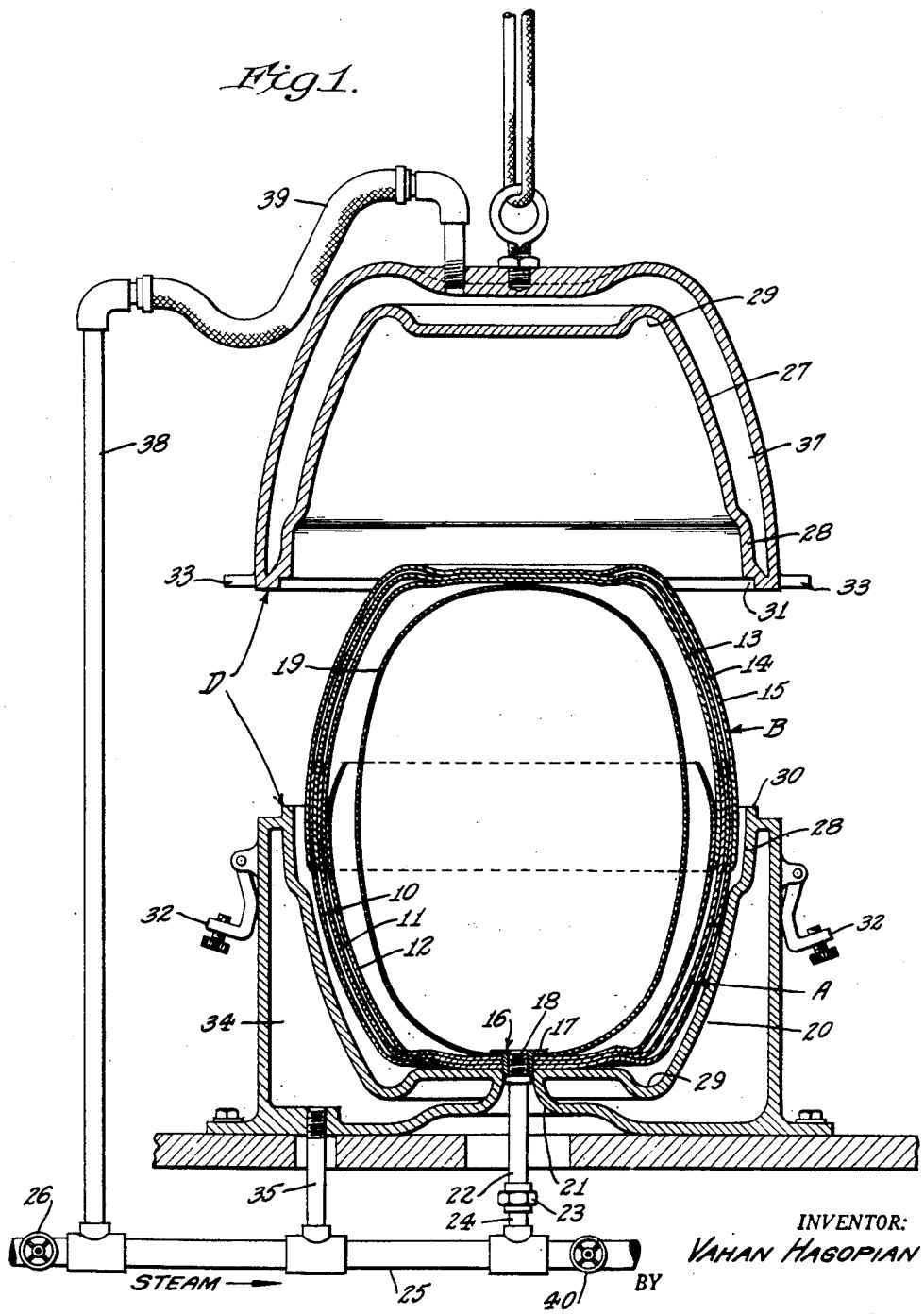

Feb. 8, 1949. V. HAGOPIAN 2,460,820
METHOD OF MAKING CONTAINERS
Filed March 18, 1944 2 Sheets-Sheet 2

INVENTOR:
VAHAN HAGOPIAN
BY
ATTORNEYS

Patented Feb. 8, 1949

2,460,820

UNITED STATES PATENT OFFICE 2,460,820

METHOD OF MAKING CONTAINERS

Vahan Hagopian, New York, N. Y.

Application March 18, 1944, Serial No. 527,035

6 Claims. (Cl. 93—36)

This invention relates to the manufacture of containers, such as barrels, and has particular reference to a method of making containers of plastic material, and to the container so made.

Heretofore, efforts to manufacture containers of plastic material, such as paper stock and other similar fibrous material, or combinations of sheet material and adhesive or binding agent, such as wood, cloth, fibre, or paper strips bonded together with initially plastic adhesive, and the like, have required a disproportionate degree of hand work, usually resulting in increased cost, non-uniform products, and considerable expense, and hence have not been successful on a commercial scale, except when special products of high cost were justified by requirements. Consequently, a uniform, simple and inexpensive process not requiring complicated dies or expensive machinery, for making a barrel or similar container, adaptable for storing, transporting and dispensing liquids of virtually any description, would have considerable value.

In accordance with the present invention, a simple method for making a strong, rigid hollow shell usable for any purpose, such as a barrel or other container of inexpensive and readily available raw material is provided, as well as the product resulting from the method.

More particularly, the method of this invention comprises forming cup-shaped rudimentary plies of felted material, such as paper stock, and other vegetable fibres, such as hemp, jute, cotton, and the like, animal fibres or mixtures of the vegetable and animal fibres, by a conventional process of wet felting on a foraminous form or screen; coating or impregnating such cup-shaped plies with a suitable adhesive, preferably a thermo-responsive adhesive, such as a phenolic, urea, vinyl, or other similar synthetic resin; nesting two or more of such cup-like plies to form a laminar set; placing two such sets with their concave sides in opposed relation, and with the edges of the plies of one set inserted between the edges of the plies of the opposed set; introducing an inflatable bag of elastic material within the rudimentary container thus formed, or within one of the sets before interfitting the same with the other set; sealing the opening of the bag to the bung or other access opening of the container by means of a suitable fitting extending through the plies of one of the sets; placing the assembly in a split die having the shape of the finished product, and heated if thermo-responsive adhesive is used, and inflating the bag by applying a source of fluid pressure to the fitting, so that the inflated bag forces and compresses the plies against the interior of the die and causes the adhesive to secure the plies together and mold them to the contour of the die.

The bag-inflating medium may be a heated fluid, such as steam, if thermo-responsive adhesive is used, and in that case the bag preferably is also formed of thermo-plastic material so as to soften and become bonded to the interior of the container, to thereby serve as the permanent fluid-impervious liner therefor, thus simultaneously assuring liquid tightness of the container and rendering the same immune to deterioration from many liquids that may be stored therein.

The hollow shell is substantially a finished product when withdrawn from the die and the double-thickness of its wall around its center portion, augments its strength at that point, where it is most needed in the case of a barrel, particularly in the case of large barrels which are commonly dropped and rolled on the bilge when being handled. In order to increase the strength of the chine in the case of a barrel, a preformed reinforcing ring is inserted between the plies at each end before molding, and these rings also serve to emphasize the chine, thus simulating the projecting chine on a conventional stave-type barrel.

It will be seen that a container of this invention has novel seamless construction, fluid-tightness, lightness and strength, and may be made uniformly in quantity at low expense by the method of this invention.

Figure 2:
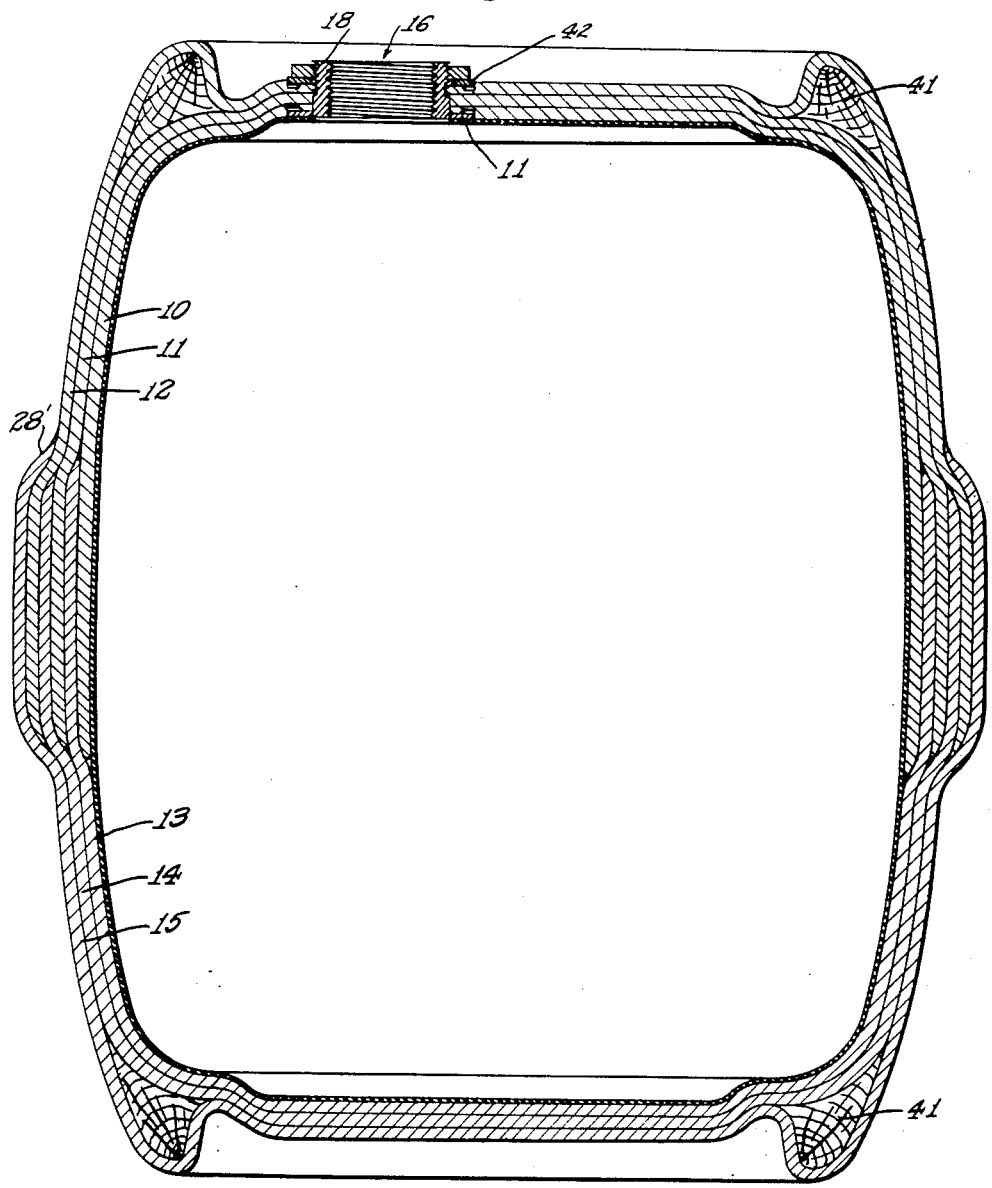

For a more complete understanding of this invention, reference may be had to the accompanying drawings, in which:

Fig. 1 illustrates the steps of the method and preferred apparatus for making a container, such as a barrel, according to this invention; and Fig. 2 illustrates an example of the finished container of this invention, as seen in axial section.

Referring to Fig. 1 of the drawings, numerals 10 to 15, inclusive, designate cup-shaped rudimentary plies, each comprising a felted or otherwise conformed mass of fibrous material, such as paper stock, wood fibres, including the lignin, hemp, sisal, jute, tow fibre, cotton, or other vegetable fibres, animal fibre, such as hair, or mixtures of animal and vegetable fibre, the fibres being sufficiently closely felted or compacted, or both, to render the cup-shaped plies self-sustaining and capable of being handled for assembly purposes without disintegration or tearing. Such cup-shaped plies are formed by the conventional dry or wet felting process. In the latter, a slurry of water and the fibre is drawn against the surface of a foraminous form or screen of the desired dome-shaped contour, and when a sufficient thickness of layer has been collected on the screen, the layer is ejected by pressure from within the screen and then stripped off and dried. Because the plies so formed are relatively loosely felted, they may be stretched to some extent and thus may be made of uniform initial size for making a particular container.

Preferably the dried plies 10 to 15 are impregnated with a suitable thermo-responsive resin, such as a phenolic or urea condensation product, vinyl resin, or the like, or the plies may be coated therewith as by spraying with an aqueous mixture or solution of the resin, and then dried. It is also to be understood that although thermo-responsive adhesives are preferred, so-called "wet" or cold-setting adhesives such as casein, dextrin or animal or fish glues and the like, may also be used, depending on the use to which the container is to be put. However, the use of thermo-responsive type of adhesive will be contemplated herein, to illustrate but not limit the method of this invention.

The adhesive-impregnated or -coated plies are then nested in sets of one or more, preferably not less than three per set, as indicated in Fig. 1, wherein one set, designated A, is shown as composed of plies 10, 11 and 12, and the other set, designated B, being composed of plies 13, 14 and 15.

One set of nested plies, such as A, will contain the access opening or openings of the finished container, such as the bung in the case of a barrel, with or without an additional air vent. Considering a container having a small opening such as a bung in the head, positioned at the desired point, the set A is perforated through the three plies for the reception of a nipple 16 of metal or plastic. The nipple 16 is provided at one end with a flange 17 having a roughened interior surface to bite into the adjacent plies and thus prevent the nipple from turning. The shank 18 is exteriorly and interiorly threaded, as shown in greater detail in Fig. 2.

Before being inserted into the bung opening in plies of set A, the edge of an opening in a fluid-tight bag 19 is cemented or otherwise permanently sealed pressure-tightly to the outer or inner surface of flange 17 of nipple 16. The bag 19 is made of elastic material, such as rubber, coated on the outside so as to be adhesive, or the adhesive may be that with which the inner plies 10 and 13 are impregnated or coated, so that when inflated, the bag 19 lies coextensively with the inner surface of the container and becomes adhered thereto. Preferably, however, the bag 19 is composed of material which, while somewhat elastic, becomes more so when heated, and if sufficiently heated, softens so as to become adhesive. An example of such material is polyvinyl chloride, but other materials having similar properties may be employed with equal facility.

The ply set A, with the nipple 16 inserted through the bung opening, may be placed in the lower half 20 of a split die D having an opening 21 for the nipple shank 18, into the interior of which has been screwed flexible supply pipe 22 which is then connected by union 23 to pipe 24, which is connected to header 25 controlled by valve 26. Then the second set of plies B is inverted over the first set A and the free edges of the one set inserted between the edges of the plies of the other set so that the plies of both sets interfit and partially overlap. Thus, as shown in Fig. 1, the edge of ply 14 lies between the edges of plies 10 and 11; the edge of ply 11 lies between the edges of plies 13 and 14, and so on. If more convenient or desirable, the plies of the two sets A and B may be assembled together as described, before being inserted in the lower die half 20.

The die D, comprising lower half 20 and upper half 27, is shaped to the contour desired for the finished product, such as the barrel shown. The die D is relieved at 28 to accommodate the doubled thickness of the stock at the bilge due to the overlapping of the edges of the plies at that point, as described. The die D may also be relieved at 29 to provide the chine of the finished barrel, as shown, and the lower die half 20 is preferably provided with a registering tongue 30 which fits into the groove 31 in the upper die half to assure alignment when the upper die half 27 is lowered on the lower die half 20.

Latches 32 on the lower die half 20 cooperate with lugs 33 on the upper half 27 to lock the die D closed when in operation, but no attempt is made to seal the die air-tightly, but on the contrary, the joint between the die halves should not be air tight, so as to permit the air and steam to be purged therefrom as the bag 19 is inflated. Other vent holes in the die may be provided if desired.

When the adhesive employed is of the thermo-responsive type, as herein contemplated for purposes of illustration, the die D is heated, preferably by steam, which is supplied from header 25 and pipe 35 to the jacket 34 surrounding lower die half 20, and to the jacket 37 surrounding the upper die half 27 by pipe 38 and flexible hose 39. A normally closed purge valve 40 is provided, for exhausting die jackets 34 and 37 and bag 19 after the bonding operation is complete. The pipes 24, 35 and 38 may also be provided with individual flow and pressure control valves if required. The die D may be electrically heated instead, if desired.

In carrying out the preferred method of molding the container according to this invention, the plies 10 to 15, impregnated with the dry thermo-responsive adhesive and assembled in the manner described, are enclosed in the die D and steam is supplied thereto and to bag 19 by opening valve 26. The bag 19 expands and forces the plies into conformity with the contour of the die D, while the adhesive becomes plastic in response to the heat applied thereto. The bag 19 also softens and becomes adhesive, so as to bond itself coextensively to the interior surface of the container.

After heating for a predetermined time, depending upon the adhesive used, the size of the article being molded and the molding pressure being used, the steam is turned off by closing valve 26 and the steam exhausted from die jackets 34 and 37 and bag 19 by opening valve 40. After cooling and when the adhesive is set, the finished container is removed from the die D after uncoupling union 23 and then disconnecting pipe 22 from the nipple 16. A flat nut 41 may then be screwed down on the shank 18, over a washer 42, to complete the barrel, as shown in Fig. 2.

As indicated, the hollow shell thus formed may have any desired shape or contour required for its intended function. Thus, if intended for use as a container of, the barrel shape shown in Figs. 1 and 2, it may be provided either with a center bung, as in Fig. 1, or an offset bung, as in Fig. 2, or with any one or more desired different openings. For liquid-containing barrels, kegs, carboys, etc., or for any other purpose, the container is provided with the permanent fluid-impervious liner, formerly the bag 19, as shown in Fig. 2. Also, as shown especially in Fig. 2, the plies 10 to 15 are reduced in thickness by the pressure and the double-thickness plies at the equator form a relatively thick band 28' which imparts augmented strength to the hollow shell thus formed, without materially increasing its weight or size and, in the case of a barrel, the band 28' may be bulged outwardly as shown and thus serve as the bilge of the barrel. The wall of the hollow shell, being made of fibres and plastic, is very strong, substantially rigid and essentially homogeneous and, as indicated, may serve any purpose, in whole or in part. Selected zones of the hollow shell, such as the chine 29 in the case of a barrel, may be strengthened and emphasized by incorporating between the plies at that point a ring 41 of steam-wood, plywood, precompressed fibre or other suitable material, further reinforced with metal wire, if desired. Other modifications in the method and product of this invention may be made within the scope of the appended claims in which the term "container" is used to denote a hollow shell having substantially rigid walls, for any use.

I claim:

1. The method of making a container, which comprises forming cup-shaped elements, overlapping the edges of at least two of said elements with their concave sides in opposed relation with adhesive at least at said overlapped edges of said elements, enclosing an elastic bag between said elements, said bag having an adherent outer surface when heated, and applying pressure internally of the rudimentary container thus formed by inflating said bag with heated fluid while exteriorly confining the overlapped edges thereof to thereby cause said adhesive to secure said overlapped edges together and cause said bag to adhere to the inner surface of said container to serve as the permanent liner therefor.

2. The method of making a container, which comprises assembling at least two cup-shaped elements with their concave sides in opposed relation and their edges overlapping, said elements containing thermo-responsive material, enclosing a flexible bag between said elements having an external area substantially equal to the interior surface area of the finished container when the bag is inflated, inflating said bag while exteriorly confining the rudimentary container thus formed, and adhering said bag to the interior surface of said assembled elements and said overlapped edges of said elements together by rendering said thermo-responsive material adhesive by the application of heat to thereby form a container having said bag as a permanent liner.

3. The method of making a container, which comprises assembling at least two cup-shaped elements with their concave sides in opposed relation and their edges overlapping, said elements containing fibrous and thermo-responsive materials, enclosing a flexible bag between said elements having an external area substantially equal to the interior surface area of the finished container when the bag is inflated, inflating said bag while exteriorly confining the rudimentary container thus formed, and adhering said bag to the interior surface of said assembled elements and said overlapped edges of said elements and fibres together by the application of heat to thereby form a container having said bag as a permanent liner.

4. The method of making a container, which comprises assembling at least two cup-shaped elements with their concave sides in opposed relation and their edges overlapping, said elements comprising fibrous material impregnated with thermo-responsive adhesive, enclosing a flexible bag between said elements having an external area substantially equal to the interior surface area of the finished container when the bag is inflated, inflating said bag while exteriorly confining the rudimentary container thus formed, applying heat to the container while under the pressure provided by the inflated bag to thereby cause the said thermo-responsive adhesive to bond said fibrous material and overlapped portions of the said elements together, and adhering said bag to the interior surface of said assembled elements to thereby form a container having said bag as a permanent liner.

5. The method of making a container, which comprises assembling a plurality of cup-shaped elements in nested relation, assembling two sets of such nested elements with their concave sides opposed and with the edges of the elements of one set interposed between and overlapping the edges of the elements of the other set, with adhesive interposed between the elements of each set, enclosing an inflatable bag within the multiple-ply rudimentary container thus formed, said bag having an opening, sealing said bag opening to an opening through the wall of said multiple-ply rudimentary container, confining said rudimentary container within a die having the contour desired for the finished container, applying a source of fluid pressure to said last opening to inflate the bag to simultaneously adhere the contiguous plies of said rudimentary container together and conform the same to the contour of the die, and adhering the bag to the inner wall of the container to serve as a permanent liner.

6. The method of making a container, which comprises assembling a plurality of cup-shaped elements in nested relation, assembling two sets of such nested elements with their concave sides opposed and with the edges of the elements of one set interposed between and overlapping the edges of the elements of the other set, with adhesive interposed between the elements of each set, enclosing an inflatable bag within the multiple-ply rudimentary container thus formed, said bag being composed of material rendered adhesive when heated and having an opening, sealing said bag opening to an opening through the wall of said multiple-ply rudimentary container, confining said rudimentary container within a die having the contour desired for the finished container, applying a source of fluid pressure to said last opening to inflate the bag to simultaneously adhere the contiguous plies of said rudimentary container together and conform the same to the contour of the die, and adhering the bag to the inner wall of the container by rendering the bag adhesive by the application of heat thereto, to cause the bag to serve as a permanent liner.

VAHAN HAGOPIAN.

REFERENCES CITED

The following references are of record in the file of this patent:

UNITED STATES PATENTS

| Number | Name | Date |
|---|---|---|
| 930,316 | Rehm | Aug. 3, 1909 |
| 1,209,644 | Price | Dec. 19, 1916 |
| 1,367,231 | Boyer | Feb. 1, 1921 |
| 1,388,123 | Roberts | Aug. 16, 1921 |
| 1,428,469 | Boyger | Sept. 5, 1922 |
| 1,452,039 | Gravel | Apr. 17, 1923 |
| 1,504,547 | Edgerton | Aug. 12, 1924 |
| 1,638,386 | Yancey | May 9, 1927 |
| 1,865,481 | Penfold | July 5, 1932 |
| 1,993,751 | Reid | Mar. 12, 1935 |
| 2,337,891 | Hultin | Dec. 28, 1943 |
| 2,338,604 | Silveyra | Jan. 4, 1944 |

FOREIGN PATENTS

| Number | Country | Date |
|---|---|---|
| 492,739 | Great Britain | Dec. 21, 1936 |